United States Patent [19]

Dethlefs et al.

[11] Patent Number: 5,252,658
[45] Date of Patent: Oct. 12, 1993

[54] PIGMENT-CONTAINING PREMIXTURE OF TITANIUM DIOXIDE WITH OLEFIN POLYMER

[75] Inventors: Ralf-Burkhard Dethlefs, Bissendorf; Bernd Scholz, Osnabrück; Wolfram Wysk, Belm, all of Fed. Rep. of Germany

[73] Assignee: Felix Schoeller jr GmbH & Co. KG, Osnabruck, Fed. Rep. of Germany

[21] Appl. No.: 440,902

[22] Filed: Nov. 22, 1989

Related U.S. Application Data

[63] Continuation-in-part of Ser. No. 185,869, Apr. 25, 1988, Pat. No. 4,935,298.

[30] Foreign Application Priority Data

May 15, 1987 [DE] Fed. Rep. of Germany ....... 3716269

[51] Int. Cl.$^5$ ................................................ C08K 3/22
[52] U.S. Cl. ................................. 524/492; 524/528; 524/570
[58] Field of Search ............... 524/430, 497, 528, 536, 524/570

[56] References Cited

U.S. PATENT DOCUMENTS

| | | | |
|---|---|---|---|
| 3,523,810 | 8/1970 | Swank | 524/497 |
| 3,577,253 | 5/1971 | Foss | 524/497 |
| 4,124,562 | 11/1978 | Yui | 524/430 |
| 4,209,430 | 6/1980 | Weber | 524/497 |
| 4,650,747 | 3/1987 | Uno | 430/536 |

FOREIGN PATENT DOCUMENTS 0292120 11/1988 European Pat. Off. .
2650340 5/1978 Fed. Rep. of Germany .

Primary Examiner—Christopher Henderson
Attorney, Agent, or Firm—Horst M. Kasper

[57] ABSTRACT

A premixture composition for the production of water-resistant photographic support material coated with polyolefin resin for light-sensitive materials of polyolefin resin and light-reflecting white pigment comprises a polyolefin resin formed as a copolymer of ethylene and an α-olefin. A light-reflecting white pigment is intimately mixed with the said polyolefin resin. Hydrocarbon side chains derived of an α-olefin in the copolymer comprise $C_1$ to $C_{16}$ carbon atoms. The contents of the copolymer of ethylene and α-olefin in the premixture composition amounts to from about 10 weight-percent to 100 weight-percent of the complete premixture composition. The light-reflecting white pigment is titanium dioxide. The titanium dioxide employed in the mixture has been subjected to a chemical after-treatment.

19 Claims, No Drawings

PIGMENT-CONTAINING PREMIXTURE OF TITANIUM DIOXIDE WITH OLEFIN POLYMER

CROSS-REFERENCE TO RELATED APPLICATIONS

This application is a continuation-in-part application of another application filed Apr. 25, 1988 and bearing Ser. No. 07/185,869 now U.S. Pat. No. 4,935,298. The entire disclosure of the application is hereby incorporated in this application as if fully set forth herein.

BACKGROUND OF THE INVENTION

1. Field of the Invention

The invention relates to a premixture composition for the production of water-resistant photographic support material coated with polyolefin resin.

2. Brief Description of the Background of the Invention Including Prior Art

Water-resistant photographic support materials comprise a plastic film or a base paper with synthetic resin coatings applied to preferably both sides, which include polymers, for example polyethylene, and which are applied by way of extrusion coating or which comprise an organic lacquer mixture, which is placed on the paper by way of a submersion or spray method and which is dried and hardened or solidified by employing heat or energy-rich radiation.

One or several light-sensitive layers containing silver halides are applied on one of the resin layers. In case of light-sensitive layers, reference is made to both black and white as well as color photographic layers.

The synthetic resin layer (front-side coating) disposed under the light-sensitive layer or, respectively, light-sensitive layers comprises usually a light-reflecting white pigment as well as possibly color pigments, optical brighteners and/or other additives such as antistatic agents, dispersion additives for the white pigment, antioxidants, separating agents, and the like.

The synthetic resin layer, disposed on the paper side opposite to that of the one with the light-sensitive layers (back-side coating), can be pigmented or can be left unpigmented and/or can contain other additives, which result from the use of the laminate as a photographic support material in each case and which, in principle, can correspond to those of the front-side coating.

The front-side coating can contain additional function layers which improve, for example, the adhesion of the light-sensitive layers.

In addition, the back-side coating can be provided with additional function layers which can improve, for example, the capability of writing on the material, the antistatic property, the slip properties, the flatness (planarity), or several of these properties.

In order to achieve that a resin coated photographic paper support, after a one-side application of photographic layers, does not exhibit an undesirable curvature (curl), it is usually provided that the front-side polyethylene layer comprises substantially a low-density polyethylene (LDPE), whereas the back-side polyethylene layer predominantly comprises a high-density polyethylene (HDPE), compare German Patent Application Laid Open DE-OS 2,028,600.

It is a joint property of the two polyethylene types and of their mixtures that they can only be filled to a limited extent with pigments. It is taught in German Patent Application Laid Open DE-OS 3,411,681, having an English-language equivalent=GB 2,138,964, how much the sharpness of a photographic image depends on the extent of reflection of the impinging light off the white pigments. Therefore, it is an important goal of all light-sensitive support materials to improve this reflection of the impinging light. This is achieved by employing white pigments with the highest indices of refraction, such as titanium dioxide, and by maintaining as high as possible the content in white pigment in the polyolefin resin with a very good dispersion such that a dense pigment packing is generated and present in the support near the surface. It has to be avoided in this context to generate pigment agglomerates in the polyolefin resin, since they decrease on the one hand the total light reflection and, on the other hand, they can result in disturbances and interferences during the drawing of the melt film in the extrusion coating, or later during the casting of the resin coated support with light-sensitive emulsions.

In practice of extrusion coating, the pigment concentration in a polyethylene resin coating mixture has been limited hitherto to less than 20 weight-percent and is usually between 10 and 17 weight-percent. This holds both for a pure low-density polyethylene as well as for the described mixtures of low-density polyethylene and high-density polyethylene.

For the pigmentation of polyolefin coatings, pigments are therefore not applied as such, but rather in form of premixture composition, the so-called master batch, which contains a desired pigment already dispersed in a resin to a certain predetermined concentration. The master batch is then diluted with diluting resins to prepare a resin composition with a desired content of titanium dioxide.

As for the resin suitable for the master batch, low-density-polyethylene resin (LDPE) is conventionally used, as taught, for example, in U.S. Pat. No. 4,650,747.

The production of such master batches takes place in a special operational process. Typically suited for this purpose are kneading machines, roller mills and extruders.

According to the presently existing state of the art, various methods for the production of master batches have been proposed, for example in U.S. Pat. No. 4,650,747. These methods, however, do not present a satisfactory and/or solution in every desirable respect and the distribution of the pigment particles leaves room for improvement.

SUMMARY OF THE INVENTION

1. Purposes of the Invention

It is an object of the present invention to provide a premixture composition, a so-called master batch, which allows to produce a photographic support material with an improved front-side coating containing a higher pigment-filling degree and a lower number of pigment agglomerates.

These and other objects and advantages of the present invention will become evident from the description which follows.

2. Brief Description of the Invention

A premixture composition is disclosed for the production of water-resistant support materials, comprising polyolefin resin and light-reflecting white pigment. The polyolefin component in the premixture is a copolymer of ethylene and α-olefin. The light-reflecting white pigment is intimately mixed with the said polyolefin resin. The light-reflecting white pigment preferably is titanium dioxide. The content of titanium dioxide in the composition can range from about 10 to 70 weight-percent. Additional additives can be selected from the group consisting of coloring agents, pigments, optical brighteners, matting agents, dispersing agents, slip additives, lubricants, separating agents, antistatic agents, antioxidants, and mixtures thereof.

The novel features which are considered as characteristics for the invention are set forth in the appended claims. The invention itself, however, both as to its method of operation, its products and physical requirements, together with additional objects and advantages thereof, will be best understood from the following description of specific embodiments and examples.

DESCRIPTION OF INVENTION AND PREFERRED EMBODIMENT

The contents of the copolymer of ethylene and α-olefin in the premixture composition can range from about 10 weight-percent to 100 weight-percent of the complete polyolefin resin. The α-olefin in the copolymer can comprise chains of $C_3$ to $C_{18}$ carbon atoms and includes preferably chains of $C_4$ to $C_{16}$ carbon atoms and more preferably chains of $C_4$ to $C_8$ carbon atoms. The content of α-olefin in the copolymer can range from about 0.1 to 20 mole-percent.

The α-olefin is an otherwise saturated hydrocarbon compound having a double bond between two carbon atoms, in α-position, where one of the two carbon atoms is disposed at an end of the carbon chain of the hydrocarbon. The polyolefin employed according to the invention process in the premixture is frequently called a linear low-density polyethylene.

These copolymers of ethylene and α-olefin have, depending on the kind and content in comonomers, a density of 0.880 to 0.960 $g/cm^3$. The use of these copolymers which are manufactured by heterogeneous catalysis and which have a stereospecific molecular structure allows an improvement of the pigment distribution.

In particular, the content in pigment agglomerates could be decreased, where the titanium dioxide was processed initially with an ethylene/α-olefin-copolymer in a premixture composition with a kneader or a granulating extruder. The titanium-dioxide content in such premixtures can amount up to 70 weight-percent. Other components can be added to the premixture to form the corresponding coating compositions for photographic support materials.

More than about 90 percent of the titanium dioxide can be of the rutile structure. More than about 90 percent of the titanium dioxide can be of the anatase structure.

The titanium dioxide can comprise surface residues of an after-treatment of its surface with (poly)siloxanes, alkanol amines, alkyl titanates, multifunctional alcohols, and a member selected from the group consisting of oxide or hydroxide of aluminum, silicon, zirconium, antimony and/or alkali-earth metal, zirconium aluminate, zirconium titanate, magnesium titanate, calcium titanate, sodium titanate, potassium titanate and mixtures thereof.

The titanium dioxide employed in the premixture can have an average particle size of from about 0.16 micrometer to 1.2 micrometer. The titanium dioxide employed in the premixture can have an average particle size of from about 0.2 micrometer to 0.8 micrometer. The titanium dioxide employed in the premixture can have been subjected to a chemical after-treatment. The amount of titanium dioxide employed in the premixture can be from about 20 to 50 weight-percent of the total mixture.

EXAMPLE 1

50 parts by weight of the ethylene/α-octene-copolymer with 1.0 mole-percent octene-(1), density=0.935 $g/cm^3$, and 50 parts by weight of a titanium dioxide pigment, containing 97.5 weight-percent rutile and surface-coated with $Al_2O_3$ were fed into a granulating extruder and mixed at 130° C. to obtain high-concentration master batch I. This master batch was then diluted with diluting resins to obtain compositions for photographic coatings.

EXAMPLE 2

50 parts by weight of the ethylene/α-butene-copolymer with 3.2 mole-percent butene-(1), density-0.915 $g/cm^3$, and 50 parts by weight of a titanium dioxide pigment, containing 97.5 weight-percent rutile and surface-coated with $Al_2O_3$ were fed into a granulating extruder and mixed at 130° C. to obtain high-concentration master batch II. This master batch was then diluted with a diluting resin to obtain compositions for photographic coatings.

EXAMPLE 3

50 parts by weight of the ethylene/4-methylpentene-(1)-copolymer with 5.6 mole-percent 4-methylpentene-(1), density=0.920 $g/cm^3$, and 50 parts by weight of a titanium dioxide pigment, containing 97.5 weight-percent rutile and surface-coated with $Al_2O_3$ were fed into a granulating extruder and mixed at 130° C. to obtain high-concentration master batch III. This master batch was then diluted with a diluting resin to obtain composition for photographic coatings.

EXAMPLE 4

50 weight-percent of the ethylene/α-octenecopolymer, density=0.920 $g/cm^3$, with 3.2 mole-percent octene-(1) and 48.5 weight-percent of titanium dioxide pigment (the same one as in Examples 1–3), as well as 0.5 weight-percent ultramarine blue, 0.6 weight-percent antioxidant (Tinuvin 770), 0.2 weight-percent metal stearate, and 0.2 weight-percent cobalt violet were supplied into a granulating extruder and mixed at 130° C. to obtain high-concentration master batch IV. This master batch was then diluted with a diluting resin to obtain composition for photographic coatings.

EXAMPLE 5

This experiment was performed in the same manner as experiments 1–3, but the copolymer used in the premixture was an ethylene/α-hexadecene-copolymer with 0.2 mole-percent hexadecene-(1). The master batch obtained in this experiment was master batch V.

EXAMPLE 6

50 weight-percent of a titanium dioxide pigment, containing 97.5 weight-percent rutile and surface-coated with $Al_2O_3$, 30 weight-percent of ethylene/α-butene-copolymer, density=0.915 $g/cm^3$, with 3.2 mole-percent butene-(1) and 20 weight-percent low-density polyethylene with a density of 0.924 $g/cm^3$ were fed into a granulating extruder and mixed at 130° C. to obtain high-concentration master batch VI. This master batch was then diluted with a diluting resin to obtain composition for photographic coatings.

COMPARISON EXAMPLE

A conventional premixture A was prepared by mixing and kneading of 50 weight-percent of low-density polyethylene, LDPE, having a density of 0.924 g/cm$^3$ and 50 weight-percent of a titanium dioxide pigment, containing 97.5% rutile and surface-coated with $Al_2O_3$. This mixture was produced at 130° C. in a granulating extruder and then diluted with various kinds of diluting resin to obtain compositions for photographic coatings.

TESTING OF MATERIALS AND DESCRIPTION OF THE TEST METHODS FILTRATEST 200 g premixture of 50 weight-percent titanium dioxide and 50 weight-percent polyolefin resin were passed in a laboratory extruder at a melting temperature of 300° C. through a preweighed sieve of a mesh width of 25 μm. Thereafter a pure polyolefin resin was extruded through the same sieve until all pigment-containing material had passed the sieve. After calcining of the sieve at 800° C., the residue on the sieve was determined gravimetrically and was recalculated to milligrams of residue per 1 kilogram of titanium dioxide.

LEVEL OF PIGMENT AGGLOMERATES IN COATINGS

The premixtures according to the examples were diluted with various kinds of diluting resin to obtain compositions for photographic coatings. The coating was performed with a tandem extrusion coating plant at 310° C. melting temperature and 120 m/min machine speed on a band width of 120 cm. The principle of operation of a tandem extrusion plant is described, for example, in U.S. Pat. No. 4,209,584.

A photographic base paper to be coated with the abovementioned compositions was a base paper having a basis weight of 175 g/sq.m.

The front side of the base paper was Coronapretreated and coated with 30 g/sq.m (coating weight) of compositions described in Table 1.

In a transmitting light, the pigment agglomerates were counted in an area of 1 sq.m. of the coated paper, which pigment agglomerates could be recognized on an illuminating table as dark dots. This number is given as specks per square meter.

TEST RESULTS

TABLE 2

| Premixture | Mixture Titanium Dioxide ($TiO_2$) with | Filtrate test mg residue/kg $TiO_2$ |
|---|---|---|
| A | low-density polyethylene density = 0.924 g/cm$^3$ | 87 |
| I | ethylene/α-olefin-copolymer (1.0 mole-percent octene-(1)) | 24 |
| II | ethylene/α-olefin-copolymer (3.2 mole-percent butene-(1)) | 25 |
| III | ethylene/α-olefin-copolymer (5.6 mole-percent hexene-(1)) | 25 |
| IV | ethylene/α-olefin-copolymer (3.2 mole-percent octene-(1)) | 31 |
| V | ethylene/α-olefin-copolymer (0.2 mole-percent hexadecene-(1)) | 34 |
| VI | ethylene/α-olefin-copolymer: low-density polyethylene = 3:2 (3.2 mole-percent butene-(1)) | 52 |

TABLE 3

| Sample | Composition of the Front-Side Coating (weight-percent) | | | | Pigment agglomerate |
|---|---|---|---|---|---|
| | $TiO_2$ | LDPE | HDPE | ethylene/α-olefin-copolymer | |
| a | 18.0 | 64.0 | — | 18.0 | 8 |
| b | 18.0 | 57.5 | — | 24.5 | 6 |
| c | 18.0 | 24.5 | — | 57.5 | 7 |
| d | 15.0 | 49.0 | 21.0 | 15.0 | 5 |
| e | 33.0 | 23.8 | 10.2 | 33.0 | 8 |
| f | 20.0 | 60.0 | — | 20.0 | 4 |
| g | 20.0 | 60.0 | — | 20.0 | 5 |
| h | 17.5 | 64.0 | — | 18.0 | 6 |
| i | 20.0 | 60.0 | — | 20.0 | 6 |
| j | 33.0 | 37.0 | 10.2 | 19.8 | 8 |
| Comparison | 18.0 | 82.0 | — | — | 12 |
| | 15.0 | 64.0 | 21.0 | — | 13 |

The results (Table 2 and 3) of the filtratest of the premixtures and of the gel-particle level of the produced coatings illustrate that the mixtures according to the invention, employing the ethylene/α-olefin-copolymer, have a lower tendency to form pigment agglomerates. The results illustrate also that layers with higher pigment levels can be produced with ethylene/α-olefin-copolymer premixtures than hitherto with pigment-containing LDPE or HDPE premixtures.

The examples 1-6 indicate that the illustrated advantages can be achieved with various types of ethylene/α-olefin-copolymer.

TABLE 1

| Sample | Diluting Resin (weight-percent) | | | Premixture (Masterbatch) (weight-percent) | | | | | | |
|---|---|---|---|---|---|---|---|---|---|---|
| | LDPE density = 0.924 g/cm$^3$ | ethylene/α-octene copolymer density = 0.935 g/cm$^3$ (content of α-octene in copolymer = 1.0 mole-%) | Mixture of 70 weight-% LDPE with density = 0.924 g/cm$^3$ and 30 weight-% HDPE with density = 0.950 g/cm$^3$ | A | I | II | III | IV | V | VI |
| a | 64.0 | — | — | 36 | — | — | — | — | — | — |
| b | 57.5 | 6.5 | — | 36 | — | — | — | — | — | — |
| c | 24.5 | 39.5 | — | 36 | — | — | — | — | — | — |
| d | — | — | 70.0 | — | 30 | — | — | — | — | — |
| e | — | — | 34.0 | — | 66 | — | — | — | — | — |
| f | 60.0 | — | — | — | — | 40 | — | — | — | — |
| g | 60.0 | — | — | — | — | — | 40 | — | — | — |
| h | 64.0 | — | — | — | — | — | — | 36 | — | — |
| i | 60.0 | — | — | — | — | — | — | — | 40 | — |
| j | — | — | 34.0 | — | — | — | — | — | — | 66 |
| Comparison | 64.0 | — | — | 36 | — | — | — | — | — | — |
| | — | — | 70.0 | 30 | — | — | — | — | — | — |

It will be understood that each of the elements described above, or two or more together, may also find a useful application in other types of coating compositions differing from the types described above.

While the invention has been illustrated and described as embodied in the context of a water-resistant composition for support materials for production of light-sensitive materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A premixture composition for the production of water-resistant support materials coated with polyolefin resin for light-sensitive materials of polyolefin resin and light-reflecting white pigment comprising
   a polyolefin resin having hydrocarbon side chains formed as a copolymer of ethylene and an α-olefin;
   a light-reflecting titanium dioxide pigment intimately mixed with the said polyolefin resin;
   wherein hydrocarbon side chains derived of an α-olefin in the copolymer comprise C1 to C16 carbon atoms, and wherein
   the content of α-olefin forming hydrocarbon side chains in the copolymer amounts to from about 0.1 to 20 mole-percent relating to the mole sum of ethylene derived and α-olefin derived elements contained in the copolymer.

2. The premixture composition according to claim 1, wherein hydrocarbon side chains derived of an α-olefin in the copolymer comprise C2 to C14 carbon atoms 3. The premixture composition according to claim 1, wherein
   hydrocarbon side chains derived of an α-olefin in the copolymer comprise C2 to C6 carbon atoms.

4. The premixture composition according to claim 1, wherein
   the contents of the copolymer of ethylene and α-olefin in the premixture composition amounts to from about 10 weight-percent to 100 weight-percent of the complete premixture composition.

5. The premixture composition according to claim 1, wherein
   the content of titanium dioxide in the premixture composition amounts to from about 10 to 70 weight-percent.

6. The premixture composition according to claim 1, wherein more than about 90 percent of the titanium dioxide is of the rutile structure.

7. The premixture composition according to claim 1, wherein more than about 90 percent of the titanium dioxide is of the anatase structure.

8. The premixture composition according to claim 1, wherein the titanium dioxide is subjected to an after-treatment prior to mixing, wherein the titanium dioxide comprises surface residues of an after-treatment of its surface with a member selected from the group consisting of silicon dioxide, aluminum oxide, zirconium aluminate, zirconium titanate, magnesium titanate, calcium titanate, sodium titanate, potassium titanate, and mixtures thereof.

9. The premixture composition according to claim 8, wherein the titanium dioxide comprises surface residues of an after-treatment of its surface with at least one of the compounds selected from the group consisting of (poly)siloxanes, alkanol amines, alkyl titanates, and mixtures thereof.

10. The premixture composition according to claim 1, wherein the titanium dioxide is subjected to an after-treatment prior to mixing, wherein the titanium dioxide comprises surface residues of an after-treatment of its surface with at least one of the compounds selected from the group consisting of (poly)siloxanes, alkanol amines, alkyl titanates, and mixtures thereof.

11. The premixture composition according to claim 1, wherein the titanium dioxide employed in the premixture has an average particle size of from about 0.16 micrometer to 1.2 micrometer.

12. The premixture composition according to claim 1, wherein the titanium dioxide employed in the premixture has an average particle size of from about 0.2 micrometer to 0.8 micrometer.

13. The premixture composition according to claim 1, wherein the titanium dioxide pigment had been subjected to a chemical after-treatment.

14. The premixture composition according to claim 1, wherein the amount of titanium dioxide employed in the premixture is from about 20 to 50 weight-percent of the total.

15. The premixture composition according to claim 1, further comprising an additive selected from the group consisting of coloring agents, pigments, optical brighteners, delustering agents, dispersing agents, slip additives, lubricants, separating agents, antistatic agents, antioxidants, and mixtures thereof.

16. A premixture composition for the production of water-resistant support materials coated with polyolefin resin for light-sensitive materials of polyolefin resin comprising
   a polyolefin resin having hydrocarbon side chains formed as a copolymer of ethylene and an α-olefin;
   a light-reflecting titanium dioxide pigment intimately mixed with the said polyolefin resin;
   wherein hydrocarbon side chains derived of the α-olefin in the copolymer comprise C1 to C16 carbon atoms, and wherein
   the content of α-olefins forming hydrocarbon side chains in the copolymer amounts to from about 0.1 to 10 mole-percent relating to the mole sum of ethylene derived and α-olefin derived elements contained in the copolymer.

17. A premixture composition for the production of water-resistant support materials coated with polyolefin resin for light-sensitive materials of polyolefin resin and light-reflecting white pigment comprising
   a polyolefin resin having hydrocarbon side chains formed as a copolymer of ethylene and an α-olefin;
   a light-reflecting titanium dioxide pigment intimately mixed with the said polyolefin resin;
   wherein hydrocarbon side chains derived of an α-olefin in the copolymer comprise C2 to C6 carbon atoms;
   the content of titanium dioxide in the premixture composition amounts to from about 10 to 70 weight-percent; and wherein
   more than about 90 percent of the titanium dioxide is of the anatase structure.

18. A premixture composition for the production of water-resistant support materials coated with polyolefin resin for light-sensitive materials of polyolefin resin and light-reflecting white pigment comprising
- a polyolefin resin having hydrocarbon side chains formed as a copolymer of ethylene and an α-olefin;
- a light-reflecting titanium dioxide pigment intimately mixed with the said polyolefin resin;
- wherein hydrocarbon side chains derived of an α-olefin in the copolymer comprise C2 to C6 carbon atoms;
- the content of titanium dioxide in the premixture composition amounts to from about 10 to 70 weight-percent;
- the titanium dioxide comprises surface residues of an after-treatment of its surface with a member selected from the group consisting of silicon dioxide, aluminum oxide, zirconium aluminate, zirconium titanate, magnesium titanate, calcium titanate, sodium titanate, potassium titanate and mixtures thereof.

19. The premixture composition according to claim 1, wherein the titanium dioxide is subjected to an after-treatment prior to mixing, wherein the titanium dioxide comprises surface residues of an after-treatment of its surface and mixtures thereof.

* * * * *